(12) United States Patent
Brychta et al.

(10) Patent No.: US 11,556,488 B2
(45) Date of Patent: Jan. 17, 2023

(54) SINGLE-PAIR TO MULTI-PAIR ETHERNET CONVERTER

(71) Applicant: Analog Devices International Unlimited Company, Limerick (IE)

(72) Inventors: Michal Brychta, Limerick (IE); Brian Paul Murray, Dublin (IE); Jacobo Riesco-Prieto, Caceres (ES)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 17/193,451

(22) Filed: Mar. 5, 2021

(65) Prior Publication Data

US 2021/0286748 A1  Sep. 16, 2021

Related U.S. Application Data

(60) Provisional application No. 62/989,407, filed on Mar. 13, 2020.

(51) Int. Cl.
*G06F 13/40* (2006.01)
*G06F 13/42* (2006.01)

(52) U.S. Cl.
CPC ...... *G06F 13/4068* (2013.01); *G06F 13/4282* (2013.01)

(58) Field of Classification Search
CPC .................. G06F 13/4068; G06F 13/4282
See application file for complete search history.

(56) References Cited

U.S. PATENT DOCUMENTS

| | | | | |
|---|---|---|---|---|
| 6,477,170 | B1 * | 11/2002 | Lu | H04L 49/40 |
| | | | | 370/428 |
| 7,693,090 | B1 * | 4/2010 | Kimpe | H04L 41/12 |
| | | | | 370/254 |
| 10,637,993 | B1 * | 4/2020 | Dalmia | H04L 65/1033 |

(Continued)

FOREIGN PATENT DOCUMENTS

CN   113395168 A   9/2021

OTHER PUBLICATIONS

"RMII™M Specification", The RMII Consortium maintains a web site at http://www.rmii-consort.com—Copyright AMD Inc., Broadcom Corp., National Semiconductor Corp., and Texas Instruments Inc., 1997—See the RMII Consortium Addendum for a complete list of RMII Consortium members, (Mar. 20, 1998), 17 pgs.

*Primary Examiner* — Henry Tsai
*Assistant Examiner* — Harry Z Wang
(74) *Attorney, Agent, or Firm* — Schwegman Lundberg & Woessner, P.A.

(57) ABSTRACT

Disclosed are embodiments that provide digital data communication between a single-pair Ethernet and a multi-pair Ethernet. Some embodiments include a single-pair Ethernet interface that is configured to operate in at least two modes. In a first mode, the single-pair Ethernet interface operates in a conventional manner. In a second mode, alternate pin configurations are employed to provide a low-cost interoperability between a single-pair Ethernet interface and a multi-pair Ethernet interface. For example, in the second mode, the single-pair Ethernet receives, via a first receive data pin, from a first transmit data pin of the multi-pair Ethernet interface, a data signal, and receives, via a second receive data pin, from a second transmit data pin of the multi-pair Ethernet interface, a second data signal.

19 Claims, 12 Drawing Sheets

(56) References Cited

U.S. PATENT DOCUMENTS

| | | | | |
|---|---|---|---|---|
| 2001/0009553 | A1* | 7/2001 | Homann | H04L 49/351 |
| | | | | 370/445 |
| 2002/0150107 | A1* | 10/2002 | Aronson | H04L 49/9063 |
| | | | | 370/395.53 |
| 2006/0067356 | A1* | 3/2006 | Kim | H04L 29/06 |
| | | | | 370/452 |
| 2006/0140212 | A1* | 6/2006 | Han | H04L 49/351 |
| | | | | 370/466 |
| 2010/0316100 | A1* | 12/2010 | Snauwaert | H04L 12/40013 |
| | | | | 375/220 |
| 2011/0310905 | A1* | 12/2011 | Yu | G06F 13/00 |
| | | | | 370/401 |
| 2012/0236851 | A1* | 9/2012 | Woodruff | H04L 12/4625 |
| | | | | 370/389 |

* cited by examiner

SINGLE-PAIR TO MULTI-PAIR ETHERNET CONVERTER

CLAIM OF PRIORITY

This application claims priority to U.S. Provisional Application Ser. No. 62/989,407, filed Mar. 13, 2020, which is hereby incorporated by reference in its entirety.

FIELD OF THE DISCLOSURE

The present disclosure relates to the field of Ethernet communication. More specifically, the present disclosure describes a converter that provides for devices utilizing a single-pair Ethernet to communicate with devices utilizing multi-pair Ethernet.

BACKGROUND

Today a variety of proprietary standards are used in industrial networks. In particular, the process industry utilizes a network channel that can include a single-pair of conductors included in a cable of up to 1000 m meters, as an illustrative example. Industrial environments can impose severe restrictions on electrical characteristics used for signaling over such channels, such as limiting power dissipation, for example, due to the presence of an explosive environment. Standards are under development to support 10 Mb/s signaling using an Ethernet-like scheme but providing support for long conductor runs (e.g., up to 1000 m of single-pair cable, as an illustrative example). One proposal includes specification of a new physical (PHY) layer, e.g. media type (cable) but builds upon many years of standard Ethernet component and standards evolution, and relies on Ethernet layers 2 to 7, e.g. MAC, switch, etc.

The 10 Mb/s speed is a very big increase on the speeds typically used today in the process industry—but is less than the speeds in common use today in many Local Area Networks, which have long since moved on from 10 Mb/s and 100 Mb/s to 1 Gb/s and even 2.5 Gb/s and 10 Gb/s. A single-pair standard, once ratified, is expected to be widely adopted in the industry.

SUMMARY OF THE DISCLOSURE

The present inventors have recognized that adoption of an Ethernet-like single-pair signaling scheme can present challenges, such as relating to interfacing such a scheme with generally available Ethernet network devices. Accordingly, as shown and described herein, the present inventors have developed embodiments that provide digital data communication between a single-pair Ethernet and a multi-pair Ethernet. Some embodiments include a single-pair Ethernet interface that is configured to operate in at least two modes. In a first mode, the single-pair Ethernet interface operates in a conventional manner (e.g. according to the RMII Specification, revision 1.2, Mar. 20, 1998). In a second mode, alternate pin configurations are employed to provide a low-cost interoperability between a single-pair Ethernet interface and a multi-pair Ethernet interface. For example, in the second mode, the single-pair Ethernet interface provides, via a first transmit data pin, a first data signal to a first receive data pin of the multi-pair Ethernet interface, and a second data signal via a second transmit data pin to a second receive data pin of the multi-pair Ethernet interface. The single-pair Ethernet interface also receives, via a first receive data pin, from a first transmit data pin of the multi-pair Ethernet interface, a third data signal, and receives, via a second receive data pin, from a second transmit data pin of the multi-pair Ethernet interface, a fourth data signal.

One aspect disclosed is a single-pair Ethernet to multi-pair Ethernet adapter device. The device includes a multi-pair Ethernet interface, and a single-pair Ethernet interface. The single-pair Ethernet interface is configured to decode a carrier sense data valid signal received on a first transmit enable pin to determine a MII transmit enable value, and to inhibit encoding of a carrier sense signal on a first carrier sense data value pin. The device is configured to operate in a conversion mode, the conversion mode establishing a conductive connection between: a first receive data pin of the multi-pair Ethernet Interface to a first transmit data pin of the single-pair Ethernet interface, and a second receive data pin of the multi-pair Ethernet interface to a second transmit data pin of the single-pair Ethernet interface, a third receive data pin of the single-pair Ethernet interface to a third transmit data pin of the multi-pair Ethernet interface, and a fourth receive data pin of the single-pair Ethernet interface to a fourth transmit data pin of the multi-pair Ethernet interface.

In some of these aspects, the conversion mode further establishes a conductive connection between: a second carrier sense receive valid pin of the multi-pair Ethernet interface to a first transmit enable pin of the single-pair Ethernet interface, and the first carrier sense data valid pin of the single-pair Ethernet interface to a second transmit enable pin of the multi-pair Ethernet interface. In some aspects, the single-pair Ethernet interface includes a register, and the single-pair Ethernet interface is configured to operate in the conversion mode based on data written to the register. In some aspects, the single-pair Ethernet interface is configured to read data from a configuration pin, and to operate in the conversion mode based on the configuration pin. In some aspects, the single-pair Ethernet interface includes a 25 MHz clock, and generates a 25 MHz clock output signal based on the 25 MHz clock, and the 25 MHz clock output signal is provided to a clock input pin of the multi-pair Ethernet interface, and the single-pair Ethernet interface is configured to implement a RMII interface at 10 Mb/sec based on a 25 MHz reference clock. In some aspects, the single-pair Ethernet interface comprises one of a RGMII or RMII interface. In some aspects, the multi-pair Ethernet interface comprises a RMII interface. Some aspects of the device include a semi-conductor module. The semi-conductor module includes the single-pair Ethernet interface and the multi-pair Ethernet interface. The single-pair Ethernet interface and the multi-pair Ethernet interface connected to each other inside a single package. Some aspects of the device include a memory buffer, and hardware processing circuitry configured to perform operations comprising performing rate conversion, based on the memory buffer, between the single-pair Ethernet interface and the multi-pair Ethernet interface. Some aspects of the device include a serial peripheral interface (SPI), wherein the single-pair Ethernet interface is configured to communicate with the SPI, and the multi-pair Ethernet interface is configured to communicate with the SPI.

Another aspect disclosed is a method for adapting single-pair Ethernet to multi-pair Ethernet. The method includes providing, via a receive data bit zero pin of a single-pair Ethernet interface, a first data signal to a transmit data bit zero pin of a multi-pair Ethernet interface, providing, via a receive data bit one pin of a single-pair Ethernet interface, a second data signal to a transmit data bit one pin of a multi-pair Ethernet interface, receiving, via a transmit data bit zero pin of the single-pair Ethernet interface, a third data signal from a receive data bit zero pin of the multi-pair Ethernet interface, receiving, via a transmit data bit one pin of the single-pair Ethernet interface, a fourth data signal from a receive data bit one pin of the multi-pair Ethernet interface, decoding a carrier sense data valid signal received on a transmit enable pin, determining, based on the decoding, a MII transmit enable value, and inhibiting encoding of a carrier sense signal on a carrier sense data value pin.

Some of these aspects include reading a register value of the single-pair Ethernet interface and establishing the conductive connections based on the register value. Some of these aspects include reading a data value from a dip switch, and establishing the conductive connections based on the data value. Some aspects of the method include generating a 25 MHz clock output signal, providing the 25 MHz clock signal to a clock input pin of the multi-pair Ethernet interface, and implementing a reduced media independent interface (RMII) based on the 25 MHz clock signal. Some aspects of the method include performing rate conversion before providing the first and second data signals to the multi-pair Ethernet interface. Some aspects include coding a receive data valid signal on a carrier sense data valid pin. Some aspects include detecting a start of a frame on a transmit enable pin, and one or more transmit data pins consistent with media access control.

Another aspect disclosed is a non-transitory computer readable storage medium comprising instructions that configure hardware processing circuitry to adapt a single-pair Ethernet to a multi-pair Ethernet. The operations include providing, via a receive data bit zero pin of a single-pair Ethernet interface, a first data signal to a transmit data bit zero pin of a multi-pair Ethernet interface, providing, via a receive data bit one pin of a single-pair Ethernet interface, a second data signal to a transmit data bit one pin of a multi-pair Ethernet interface, receiving, via a transmit data bit zero pin of the single-pair Ethernet interface, a third data signal from a receive data bit zero pin of the multi-pair Ethernet interface, receiving, via a transmit data bit one pin of the single-pair Ethernet interface, a fourth data signal from a receive data bit one pin of the multi-pair Ethernet interface, decoding a carrier sense data valid signal received on a transmit enable pin, determining, based on the decoding, a MII transmit enable value; and inhibiting encoding of a carrier sense signal on a carrier sense data value pin.

In some of these aspects, the operations also include reading a register value of the single-pair Ethernet interface and establishing the conductive connections based on the register value. In some of these aspects, the operations also include generating a 25 MHz clock output signal, providing the 25 MHz clock signal to a clock input pin of the multi-pair Ethernet interface, and implementing a reduced media independent interface (RMII) based on the 25 MHz clock signal.

DETAILED DESCRIPTION

Figure 1:
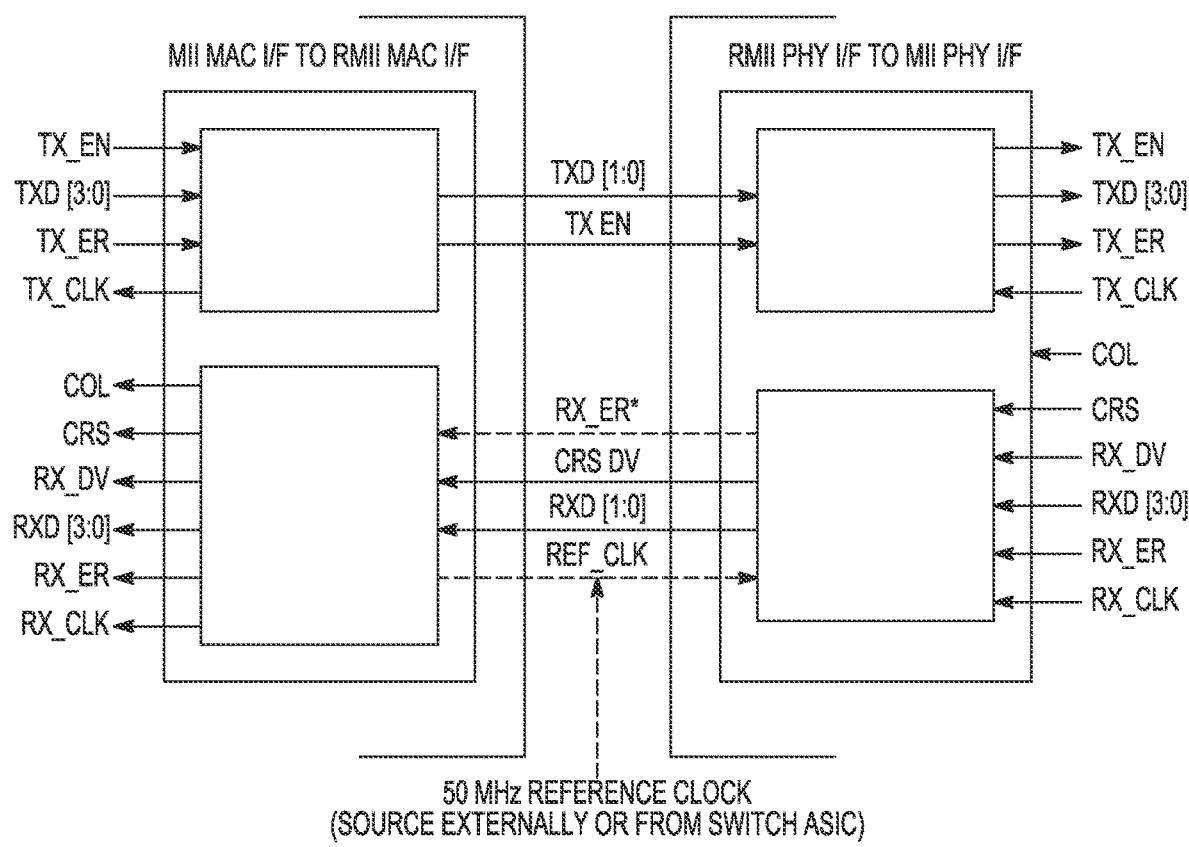
FIG. 1 shows signals and conversion from IEEE standard MII (media independent interface) to RMII standard rev 1.2

Single-pair Ethernet standards utilize just a single-pair of wires to implement Ethernet based communications. In Ethernet, a pair is understood to be an unshielded twisted pair (UTP) or shielded twisted pair (STP). Example single-pair standards include IEEE 802.3 bp 1000BASE-T1, IEEE 802.3bw 100BASE-T1, IEEE 802.3cg 10BASE-T1, and IEEE 802.3bu. These single-pair Ethernet standards are anticipated to be readily adopted, but present a mismatch in speed between single-pair Ethernet and available Ethernet switches and media access control (MAC) components. This mismatch is an impediment to the adoption of the new standard, as switch and MAC components at 10 Mb/sec are not as readily available. Nearly all 10 Mb/sec and 100 Mb/sec switches have integrated BASE-T PHYs but would not support the newly proposed single-pair 10 Mb/sec Ethernet PHY. As a result, many customers will continue to use expensive field programmable gate array (FPGA) based solutions or other interface hardware, since these are already in place in many environments. However, these FPGA solutions present a large disadvantage in terms of cost and power.

This disclosure is directed to a single-pair to multi-pair Ethernet media converter. Such a convertor would allow, for example, a 10BASE-T1 PHY to connect directly to a standard Ethernet switch PHY. Enabling such connectivity enables 10BASE-T1 PHY based devices to access a large amount of commercially available low-cost components and solutions.

The disclosed embodiments provide for a 10 M, 100 M, or 1000 M single-pair Ethernet PHY (e.g. new 10BASE-T1L 10 Mb/sec Ethernet single-pair long reach standard, or 10BASE-T1S, 100BASE-T1 or 1000BASE-T1) to connect directly (e.g. no interface chip, processor, or complex circuit between) to a standard BASE-T PHY (multi-pair Ethernet) over MAC interface pins (e.g. media independent interface (MII), gigabit media independent interface (GMII), RMII, reduced gigabit media-independent interface (RGMII). Which pins are utilized depends on a data rate supported by the solution.

Some embodiments provide a single-pair Ethernet PHY that is capable of operating in multiple modes. In a first mode, the single-pair Ethernet PHY operates in a manner consistent with the single-pair Ethernet standard. In a second mode, the single-pair Ethernet PHY presents a MAC interface that allows direct connection of pins between single-pair and multi-pair Ethernet (e.g. RXD_0 to TXD_0, etc.). The single-pair Ethernet PHY includes a configuration setting that configures the single-pair Ethernet PHY to power up in the second mode, thus requiring no software configuration or intervention.

In some embodiments, the single-pair Ethernet PHY includes a selectable mode for automatic handling of auto-negotiation and linking without user intervention. This provides for data transfer between a BASE-T network and a single-pair Ethernet network at full throughput of the 10 Mb/s link speed.

Some embodiments provide a RMII interface of a 10BASE-T1L PHY or a 10BASE-T PHY where the RMII interface uses an input reference clock of 25 MHz rather than 50 MHz. Other clocks and data rates in these embodiments conform with the RMII industry standard. Use of a 25 MHz clock simplifies the input clock source, as 25 MHz is more typical than a 50 MHz clock, and a single 25 MHz crystal can be used between the single-pair PHY and multi-pair PHY. Sending of a 25 MHz clock signal from one PHY to another is relatively simple in most implementations. This results in fewer pin connections and simpler external components.

Figure 2:
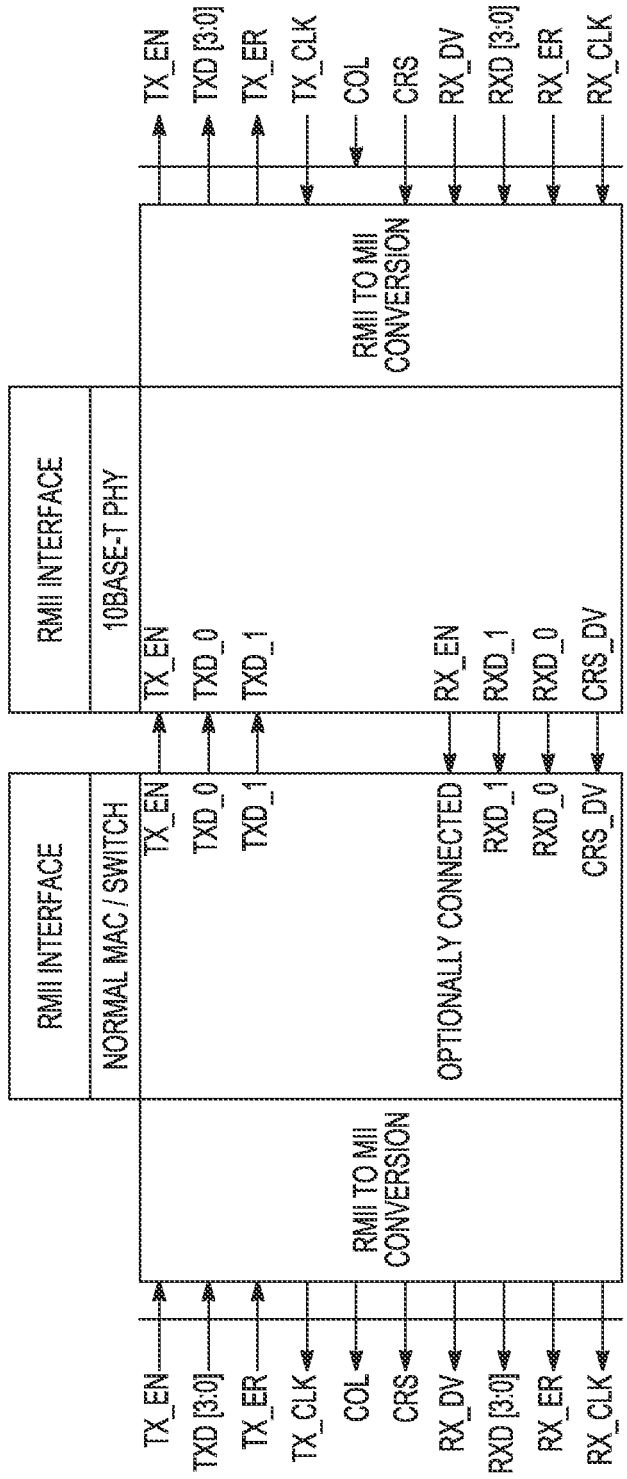
FIG. 2 shows connection of an RMII MAC/switch to a standard 10Base-T RMII PHY.

FIG. 1 shows signals and conversion from IEEE standard MIU (media independent interface to RMII standard rev 1.2. FIG. 2 shows connection of an RMII MAC/switch to a standard 10Base-T RMII PHY. For a standard RMII PHY to implement an RMII interface (e.g. to convert from IEEE standard MIU interface of a PHY to RMII), the following functions are needed:
 data bits are received from the MAC/Switch on transmit data bit zero pin (e.g. TXD_0) and transmit data bit one pin (e.g., TXD_1) that are synchronous with a 50 MHz reference clock (e.g. via REF_CLK signal),
 received data is determined to be valid by the single-pair PHY when a TX_EN pin of the multi-pair PHY is asserted,
 demultiplex data from pins TXD_1 and TXD_0 pins to MII signals (e.g. TXD[3:0]),
 data is output for transmission to the MAC/Switch via receive data bit zero (e.g. RXD_0) and receive data bit one (e.g. RXD_1) pins. This data is multiplexed from MII signals RXD[3:0], synchronous to the 50 MHz reference clock by the single-pair PHY.
 MII signals CRS (Carrier Sense) and RX_DV (receive data valid) are encoded onto CRS_DV pin by the multi-pair PHY. This is consistent with the RMII specification.

Figure 3:
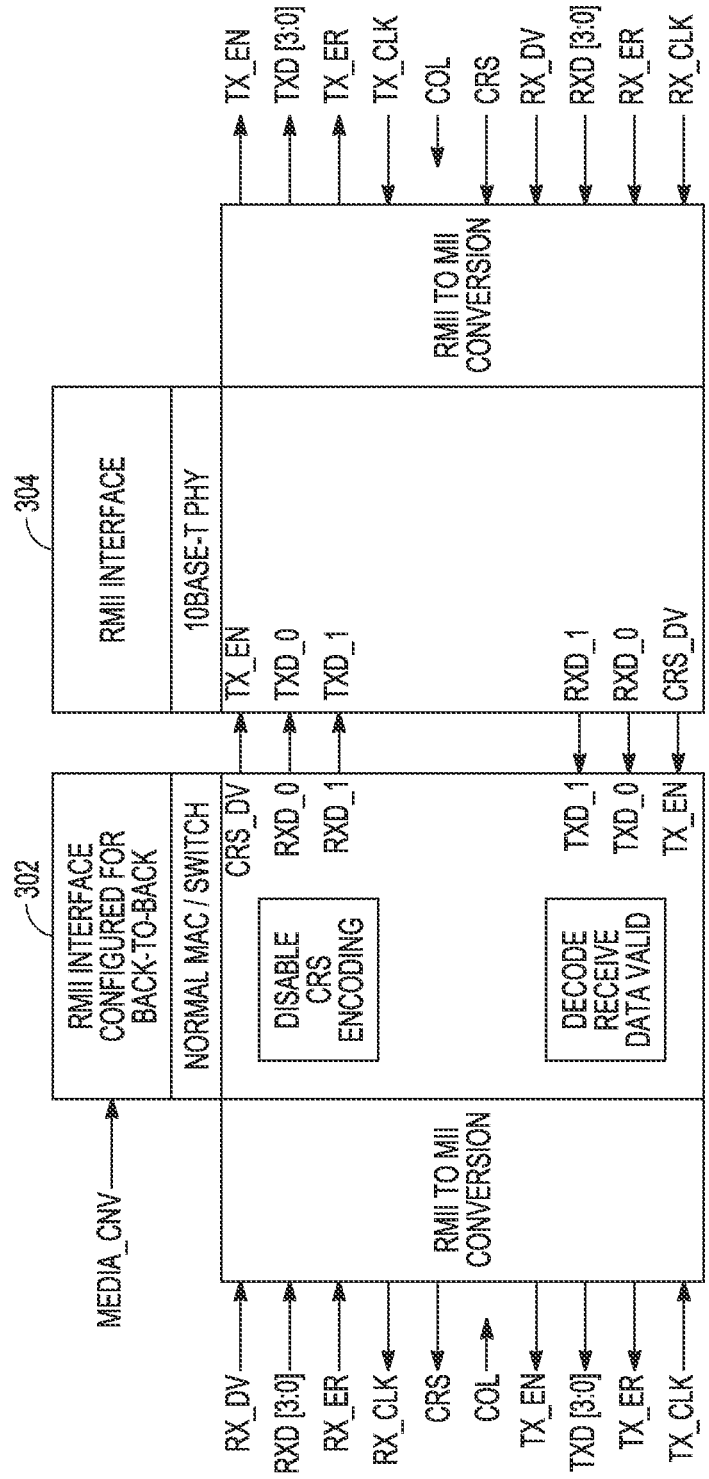
FIG. 3 shows an example embodiment of a media converter RMII PHY to a standard 10 BASE-T RMII PHY.

FIG. 3 shows an example embodiment of a media converter RMII PHY to a standard 10 BASE-T RMII PHY. These embodiments connects a RMII PHY to a standard RMIII PHY via a back to back configuration. FIG. 3 shows data flow from a carrier sense data valid external pin (e.g. CRS_DV) of the single-pair Ethernet interface 302 to a transmit enable external pin (TX_EN) of the multi-pair Ethernet interface 304. FIG. 3 also shows data flow from a first receive data external pin (e.g. RXD_0) of the single-pair Ethernet interface 302 to a first transmit data pin (e.g. TXD_0) of the multi-pair Ethernet interface 304. FIG. 3 shows data flow from a second receive data external pin (e.g. RXD_1) of the single-pair Ethernet interface 302 to a second transmit data external pin (e.g. TXD_1) of the multi-pair Ethernet interface 304. FIG. 3 shows data flow from a third receive data external pin (e.g. RXD_0) of the multi-pair Ethernet interface 304 to a third transmit data external pin (e.g. TXD_0) of the single-pair Ethernet interface 302. FIG.

3 shows data flow from a fourth receive data external pin (e.g. RXD_1) of the multi-pair Ethernet interface 304 to a fourth transmit data external pin (e.g. TXD_1) of the single-pair Ethernet interface 302. FIG. 3 also shows data flow from a second carrier sense data valid external pin (e.g. CRS_DV) of the multi-pair Ethernet interface 304 to a second transmit enable pin (e.g. TX_EN) of the single-pair Ethernet interface 302. Note that in a more traditional configuration, the multi-pair Ethernet interface 304 would connect to a MAC/Switch interface via the illustrated TX_EN, TXD_0, TXD_1, RXD_1, RXD_0, and CRS_DV pins. Similarly, in a more traditional configuration, the single-pair Ethernet interface 302 interfaces via its CRS_DV, RXD_0, RXD_1, TXD_1, TXD_0, and TX_EN pins to a MAC/Switch interface. However, in the disclosed back to back configurations, these pins are electrically connected to another PHY interface instead of the MAC interface. The disclosed embodiments describe modifications to a single-pair PHY (such as the single-pair Ethernet interface 302) to allow this back to back configuration to function.

Some of these embodiments include one or more of the following features:

A carrier sense and data valid (e.g. CRS_DV) pin of a single-pair Ethernet interface only encodes a receive data valid signal (e.g. RX_DV MII signal). This change allows the CRS_DV pin to be connected directly to the TX_EN pin on the multi-pair Ethernet PHY.

Figure 12:
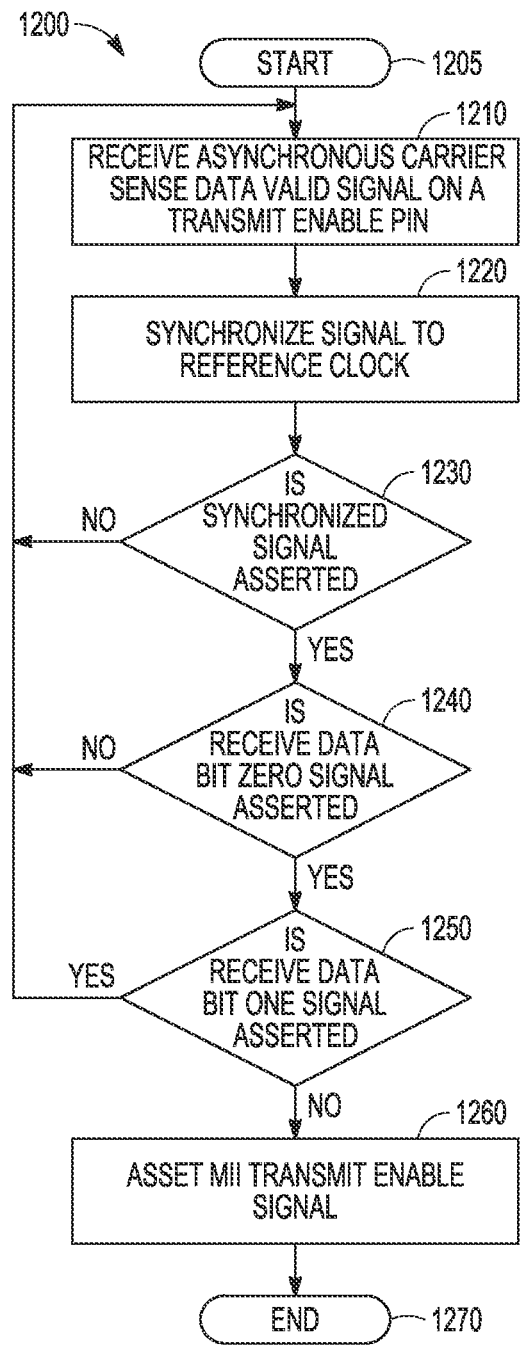
FIG. 12 is a flowchart of an example process for decoding a receive data valid signal.
Figure 13:
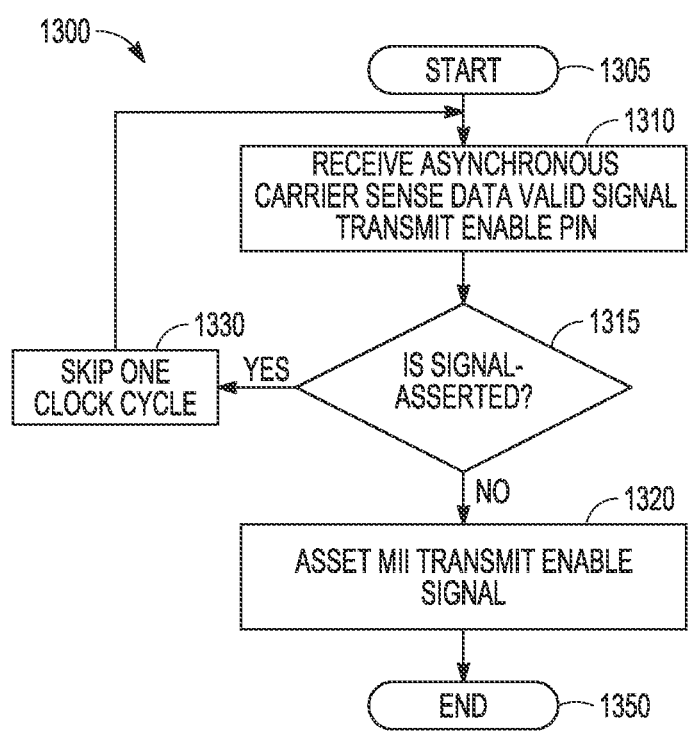
FIG. 13 is a flowchart of an example process for determining when a receive data valid signal is de-asserted.

Decoding of a receive data valid signal is performed based on a transmit enable (e.g. TX_EN) signal and transmit data signals (e.g. TXD[3:0]) from the multi-pair Ethernet interface (this is similar to a MAC implementation). FIGS. 12 and 13 provide enables of how this decoding of a receive data valid signal is performed in at least some embodiments.

Figure 4:
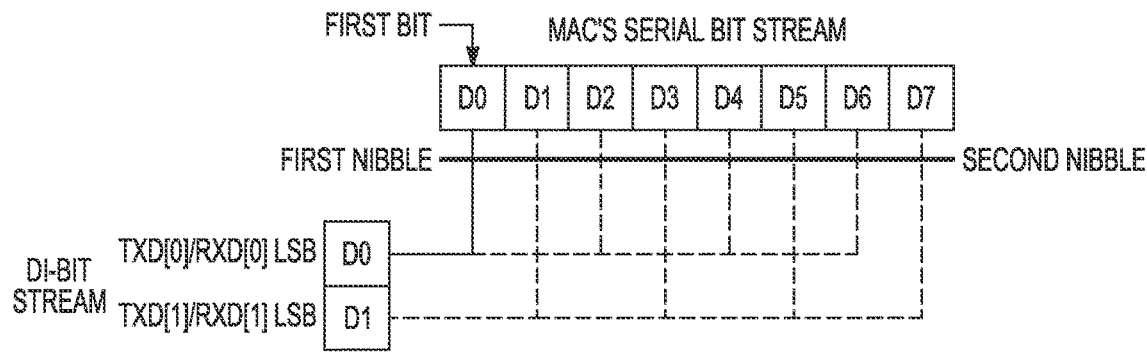
FIG. 4 shows how data bits are multiplexed with two data bits on each pin of a RMII standard rev 1.2 interface.
Figure 5:
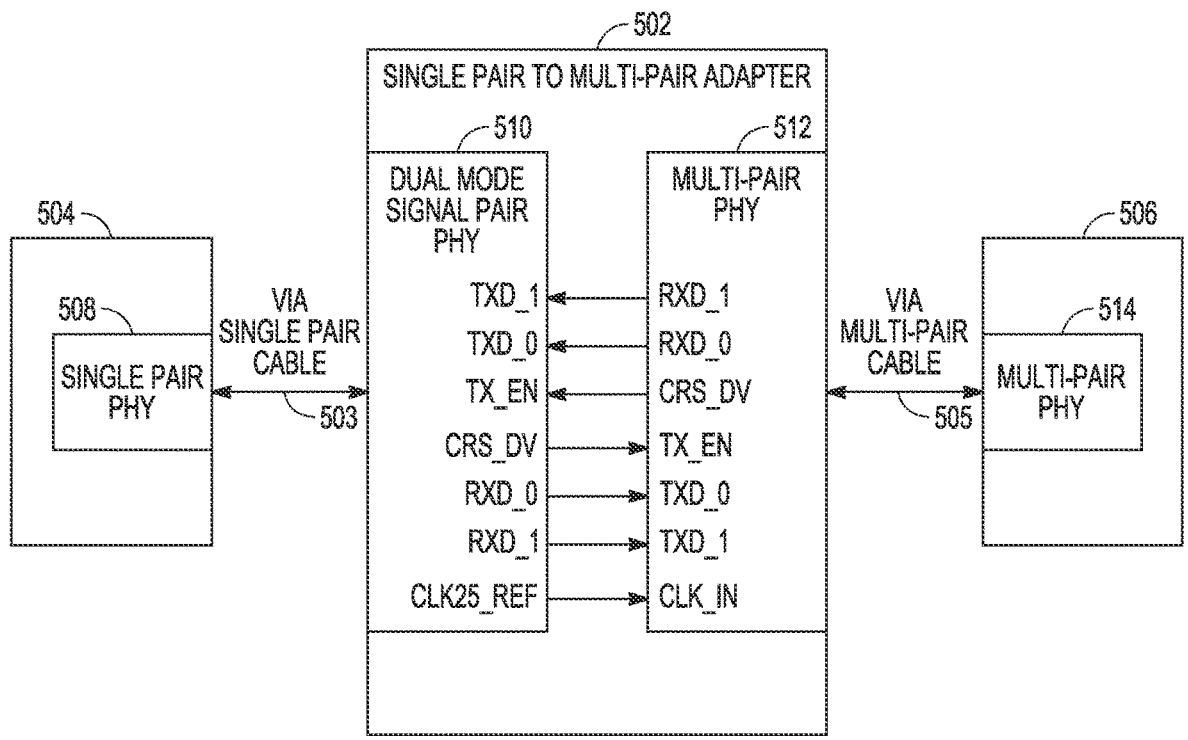
FIG. 5 is an overview diagram of one example implementation of a single-pair to multi-pair Ethernet adapter.

FIG. 4 shows how data bits are multiplexed with two data bits on each pin of a RMII standard rev 1.2 interface. FIG. 5 is an overview diagram of one example implementation of a single-pair to multi-pair Ethernet adapter. The adapter 502 is connected to a single-pair Ethernet device 504 and its single-pair PHY 508 via cable 503. The adapter 102 is also connected to a multi-pair Ethernet device 506 and its multi-pair PHY 514 via cable 505. The adapter 502 includes a dual mode single-pair ethernet interface (PHY) 510 and a multi-pair Ethernet interface (PHY) 512. The dual mode single-pair ethernet interface (PHY) 510 interfaces with the single-pair Ethernet device 504 and the multi-pair ethernet interface (PHY) 512 interfaces with the multi-pair Ethernet device 506. Each of the mode single-pair ethernet interface (PHY) 510 and the multi-pair ethernet interface (PHY) 512 takes the form, in some embodiments, of a separate integrated circuit or chip. In some embodiments, each of the single-pair ethernet interface (PHY) 510 and multi-pair ethernet interface (PHY) 512 are integrated within a single semi-conductor module. This disclosure describes an embodiment of a single-pair Ethernet interface that is configured to operate in two distinct modes. A first mode operates in a conventional manner according to single-pair Ethernet standards. A second mode operates so as to provide for connection of the single-pair Ethernet interface to a multi-pair Ethernet interface and to provide digital communication between the two interfaces. Other embodiments do not implement each of the two modes. For example, some embodiments implement only the second mode.

FIG. 5 shows how the example dual mode single-pair PHY 510 is connected to the multi-pair PHY 512. FIG. 5 shows that a first transmit data external pin (e.g. TXD_1) of the dual mode single-pair PHY 510 is connected to a first receive data external pin (e.g. RXD_1) of the multi-pair PHY 512. Data on this pin flows from the multi-pair PHY 512 to the single-pair PHY 510. A second transmit data external pin (e.g. TXD_0) of the dual mode single-pair PHY 510 is connected to a second receive data external pin (e.g. RXD_0) of the multi-pair PHY 512. Data on this pin flows from the multi-pair PHY 512 to the single-pair PHY 510. A transmit enable external pin (e.g. TX_EN) of the dual mode single-pair PHY 510 is connected to a carrier sense data valid external pin (e.g. CRS_DV) of the multi-pair PHY 512. Data on this connection flows from the multi-pair PHY to the single-pair PHY (the carrier sense data valid external pin signals the TX_EN pin of the single-pair PHY). A carrier sense data valid external pin (e.g. CRS_DV) of the dual mode single-pair PHY 510 is connected to a transmit enable external pin (e.g. TX_EN) of the multi-pair PHY 512. As shown in FIG. 5, data flows from the single-pair PHY 510 to the multi-pair PHY 512 in this connection.

A first receive data external pin (e.g. RXD_0) of the dual mode single-pair PHY 510 is connected to a first transmit data external pin (e.g. TXD_0) of the multi-pair PHY 512. Data flows from the single-pair PHY 510 to the multi-pair PHY 512 over this connection. A second receive data external pin (e.g. RXD_1) of the dual mode single-pair PHY 510 is connected to a second transmit data external pin (e.g. TXD_1) of the multi-pair PHY 512. Data flows from the single-pair PHY 510 to the multi-pair PHY 512 over this connection. A CLK25_REF pin of the single-pair PHY 510 is connected to a CLK_IN pin of the multi-pair PHY 512. Note that while references are made above to external pins, in some embodiments, the single-pair PHY 510 and multi-pair PHY 512 are integrated into a single module, and in this case, the pins might not necessarily be characterized as external. In some embodiments, they still represent external connections to the single-pair PHY and multi-pair PHY as appropriate, but are not necessarily external to the single module.

In the illustrated embodiment, the single-pair PHY 510 includes a 25 MHz crystal oscillator. Some of the disclosed embodiments forgo any additional processing circuitry that may be necessary to provide a 50 MHz clock. This reduces part count and cost of the single-pair PHY 510 in these embodiments.

Traditionally implementations include a 25 MHz crystal (e.g. quartz crystal) connected to two pins, XTAL_I and XTAL_O, with, in some embodiments, external capacitors and/or one or more resistors. These circuits provide an accurate 25 MHz clock internally in the chip via only the quartz crystal. Some embodiments include a phase locked loop (PLL) to generate additional internal clocks (e.g. 125 MHz, 250 MHz, 2 GHz, etc.). These additional internal clocks assist, in some embodiments, with compliance with one or more standard interfaces implemented by these embodiments. The single-pair PHY 510 includes a CLK25_REF pin that provides an output signal based on the 25 MHz clock internal to the single-pair PHY 510 (not shown). This CLK25_REF pin is connected, in some embodiments, to an input clock pin on the multi-pair PHY 512. In some embodiments, the clock signals are reversed, with a CLK25_REF pin of the multi-pair PHY 512 providing a 25 MHz clock signal to the single-pair PHY 510.

A standard RMII interface requires a 50 MHz clock. The requirement for a 50 MHz clock derived from a reduction in pin count for RMII from 14 pins to 6 pins (or 7 pins if the 50 MHz clock reference pin is included). RGMII is a 12-pin interface that only requires a 25 MHz clock signal, but requires 12 pins to achieve its advertised data rate. RMII has become a common interface to achieve 100 Mb/sec and in some embodiments is an interface for 10BASE-T1L implementations. This is a result of a generally lower cost due to a reduced number of pins. RMII has generally been replaced by RGMII as it supports 10 Mb/sec and 100 Mb/sec and Gigabit/sec speeds. In contrast, RMII supports 10 Mb/sec and 100 Mb/sec.

The 50 MHz clock generally requires an external clock oscillator, which is typically available via a separate component or chip to generate a 50 MHz clock from a 50 MHz quartz, crystal, as most chips are designed to work with 25 MHz. Some of the disclosed embodiments solve the costs imposed by the 50 MHz clock requirement by providing a RMII interface that functions with a 25 MHz clock rather than the 50 MHz clock. This is possible when only lower speeds are required, such as with 10 Mb/sec. In some embodiments, the 25 MHz RMII implementation allows use of a single 25 MHz quartz crystal on the single-pair PHY 510

Figure 6:
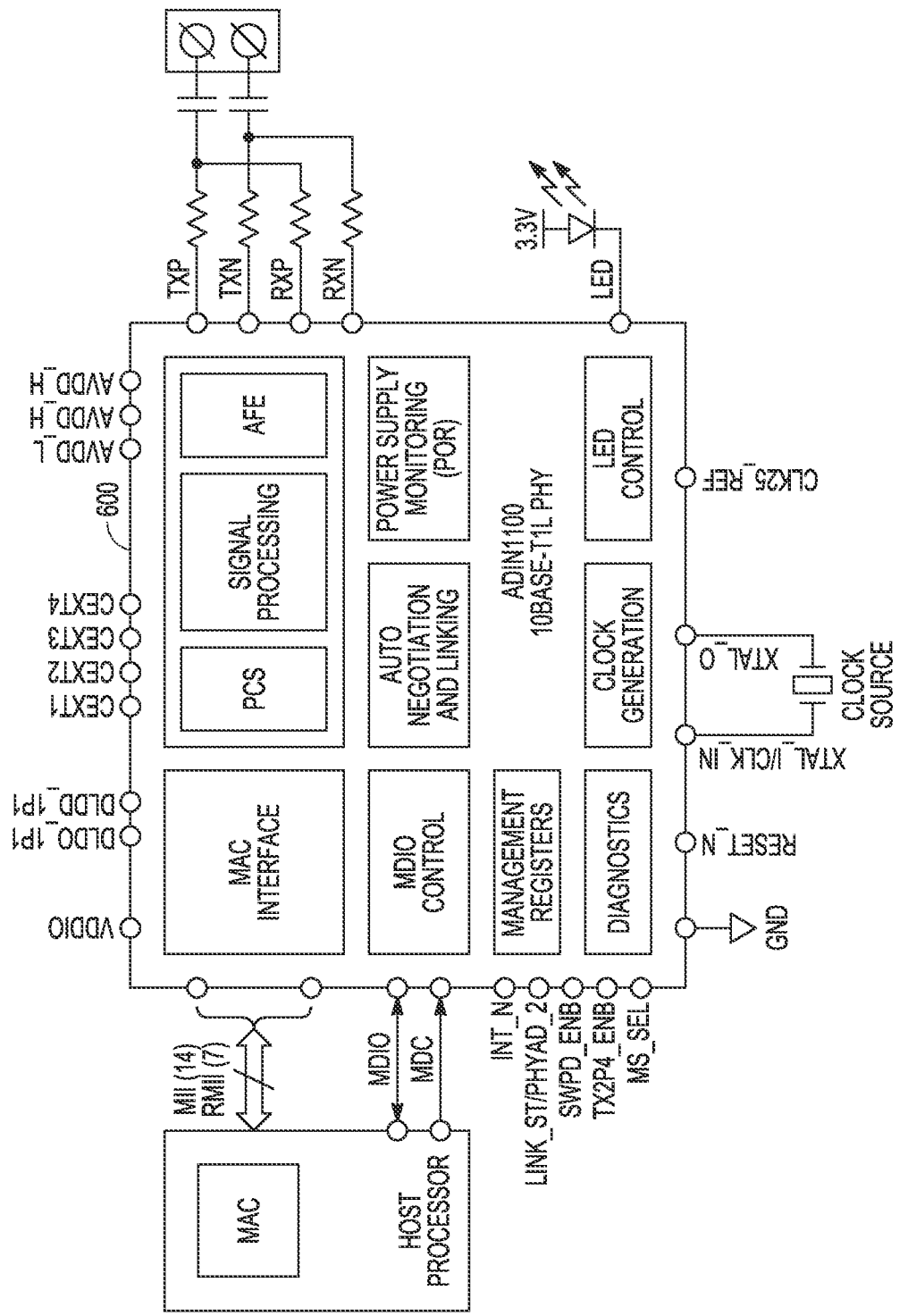
FIG. 6 is a system block diagram of an example 10BASE-T1L PHY.

FIG. 6 is a system block diagram of an example 10BASE-T1L PHY 600. Some embodiments of the dual mode single-pair Ethernet interface 510 discussed above with respect to FIG. 5 include one or more of the components illustrated in the example 10BASE-T1L PHY 600 of FIG. 6. FIG. 6 shows a screw terminal connection for a single-pair cable.

Figure 7:
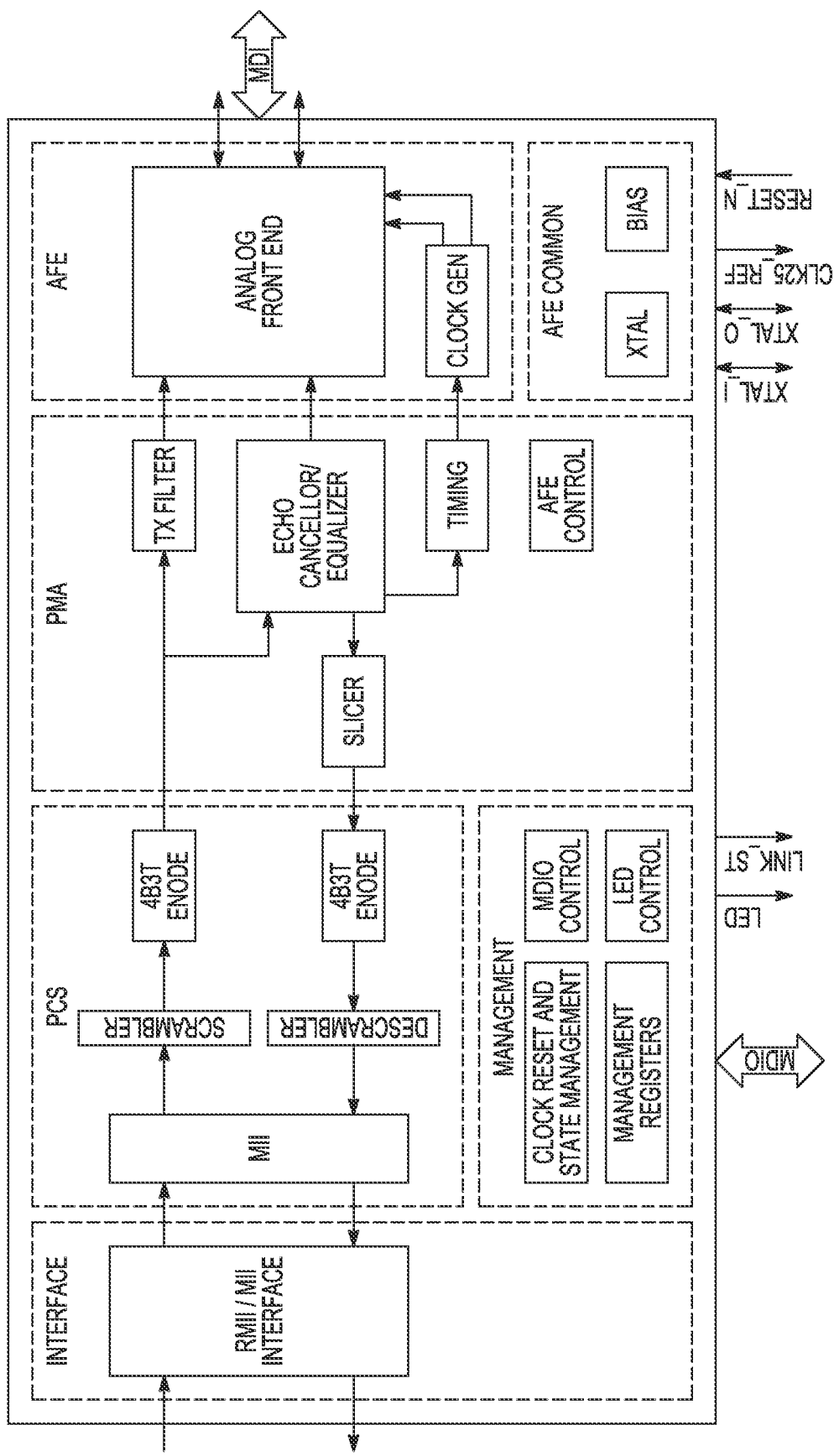
FIG. 7 is a functional block diagram of an example 10BASE-T1L PHY showing a RMII interface and an analog and digital signal processing functions of the 10BASE-T1L PHY.

FIG. 7 is a functional block diagram of an example 10BASE-T1L PHY showing a RMII interface and an analog and digital signal processing functions of the 10BASE-T1L PHY.

Figure 8:
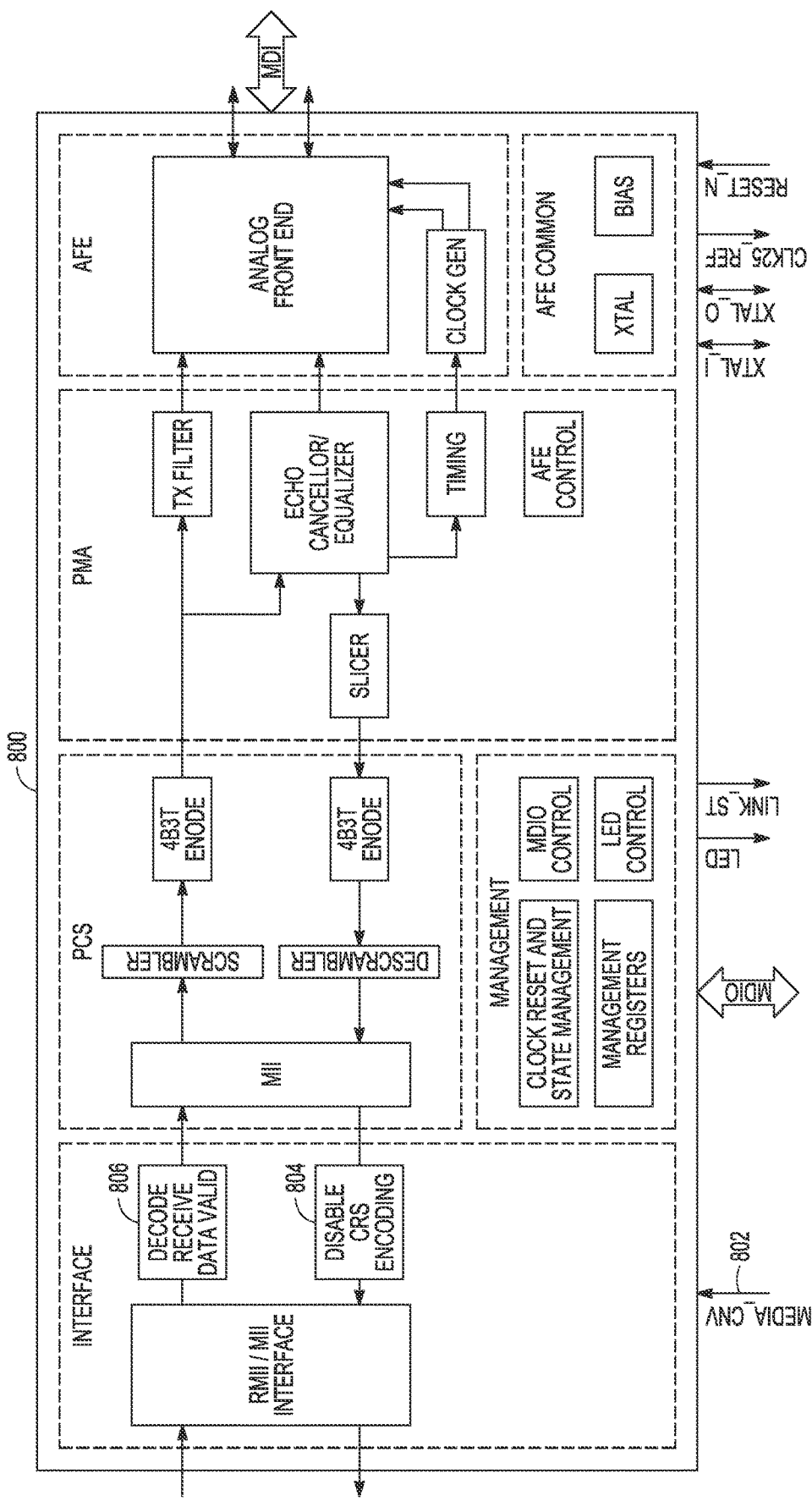
FIG. 8 is a functional block diagram of a media converter RMII 10BASE-T1L PHY.

FIG. 8 is a functional block diagram of a media converter RMII 10BASE-T1L PHY. FIG. 8 shows a single-pair Ethernet interface 800 that receives a conversion signal 802. The conversion signal 802 configures the single-pair Ethernet interface 800 to operate in either a conventional first mode or a second mode that converts certain signals to provide for data communication between the single-pair Ethernet interface 800 and a multi-pair Ethernet interface. In some embodiments, the conversion signal 802 is obtained from a dip switch included on the single-pair Ethernet interface 800 (dip switch not shown). In some embodiments, the conversion signal 802 is read from a register of the single-pair Ethernet interface 800. If the conversion signal meets a criterion, then the single-pair Ethernet interface 800 operates in the first mode and if the conversion signal meets a second criterion, then the single-pair Ethernet interface 800 operates in the second mode. When the conversion signal mees the first criterion, connective connections are established between a first set of pins of the single-pair Ethernet Interface and a second set of pins of the multi-pair Ethernet interface. When the conversion signal meets a second criterion, the single pair Ethernet interface operates in a conventional manner.

FIG. 8 also shows a disable carrier sense encoding component 804 and a decode receive data valid component 806. In conventional operation according to the standard (e.g. IEEE Std 802.3™ (Clause 22)), MII signals CRS (Carrier Sense) and RX_DV (receive data valid) are encoded onto a CRS_DV pin of a single-pair Ethernet interface. To comply with this approach, the CRS_DV pin is asserted by the single-pair Ethernet interface when the receive medium is not idle and is asserted asynchronously on detection of carrier. The CRS_DV pin is de-asserted when a carrier is lost, and this de-assertion is synchronous to the reference clock and a first di-bit of a nibble. While data is valid, the CRS_DV pin is traditionally asserted synchronous to the reference clock and the second di-bit of a nibble. Based on this design, the CRS_DV pin can toggle at the end of the frame while data is valid.

Given that the CRS_DV pin encodes both carrier sense (e.g. CRS) and data valid (e.g. RX_DV) on a single pin, the CRS_DV pin toggles while data is valid. Thus, the CRS_DV pin cannot be used to connect to a standard RMII PHY's TX_EN pin. Such a connection would result in loss of data. To avoid these problems, The disable carrier sense encoding component 804 is configured to change behavior of a carrier sense pin and data valid pin (e.g. CRS_DV) so that the pin only encodes a receive data valid RMII signal. In other words, any signaling of a carrier sense signal is inhibited on the carrier sense and data valid pin. This feature allows the carrier sense data valid pin to be connected directly to a transmit enable pin of a multi-pair Ethernet interface. With this inhibiting functionality, the carrier sense and data valid pin is also not toggled as would otherwise be the case when transmission of a frame completes.

The decoding of receive data valid component 806 is configured to detect a data valid signal via a transmit enable pin and transmit data pins of the multi-pair Ethernet interface as would be performed in a media access control (MAC). In at least one disclosed configuration, the transmit enable pin of the multi-pair Ethernet interface is electrically connected to a carrier sense and data valid pin of the single-pair Ethernet interface. Thus, the single-pair Ethernet interface is configured (via component 806) to decode the carrier sense and data valid signal supplied by the multi-pair Ethernet interface and determine a MII transmit enable signal from the carrier sense and data valid signal. An example implementation of the component 806 is provided by the discussion of FIGS. 12 and 13, discussed below.

In some embodiments, the dual mode single-pair Ethernet interface 510, discussed above with respect to FIG. 5, includes one or more of the functions and/or components discussed above with respect to the dual mode single-pair Ethernet interface 800.

Figure 9:
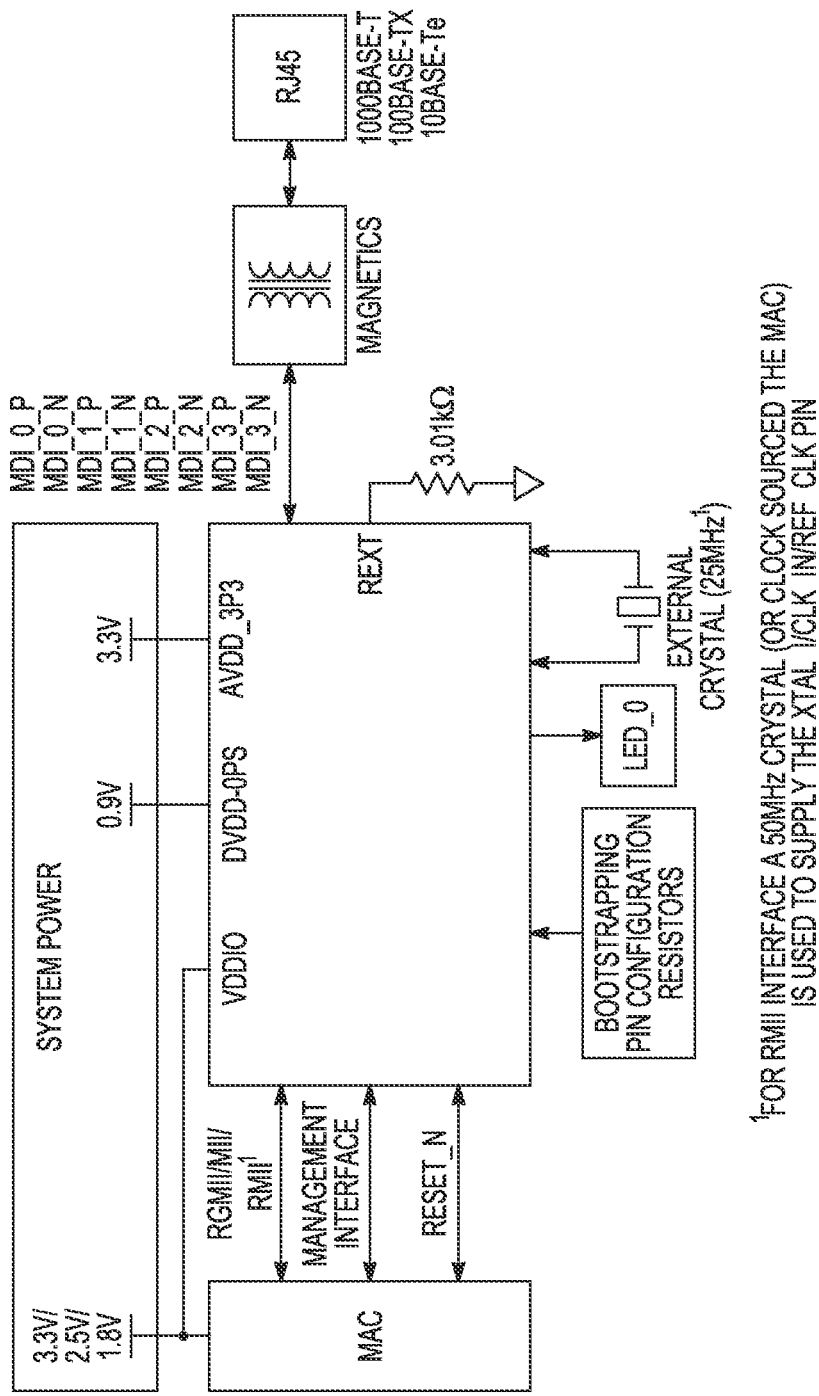
FIG. 9 shows an RMII interface and a 50 MHz crystal (or clock sourced from the MAC) is used to supply a crystal input pin (e.g. XTAL_I), clock input signal pin (e.g. CLK_IN) or a reference clock signal/pin (e.g. REF_CLK).
Figure 10:
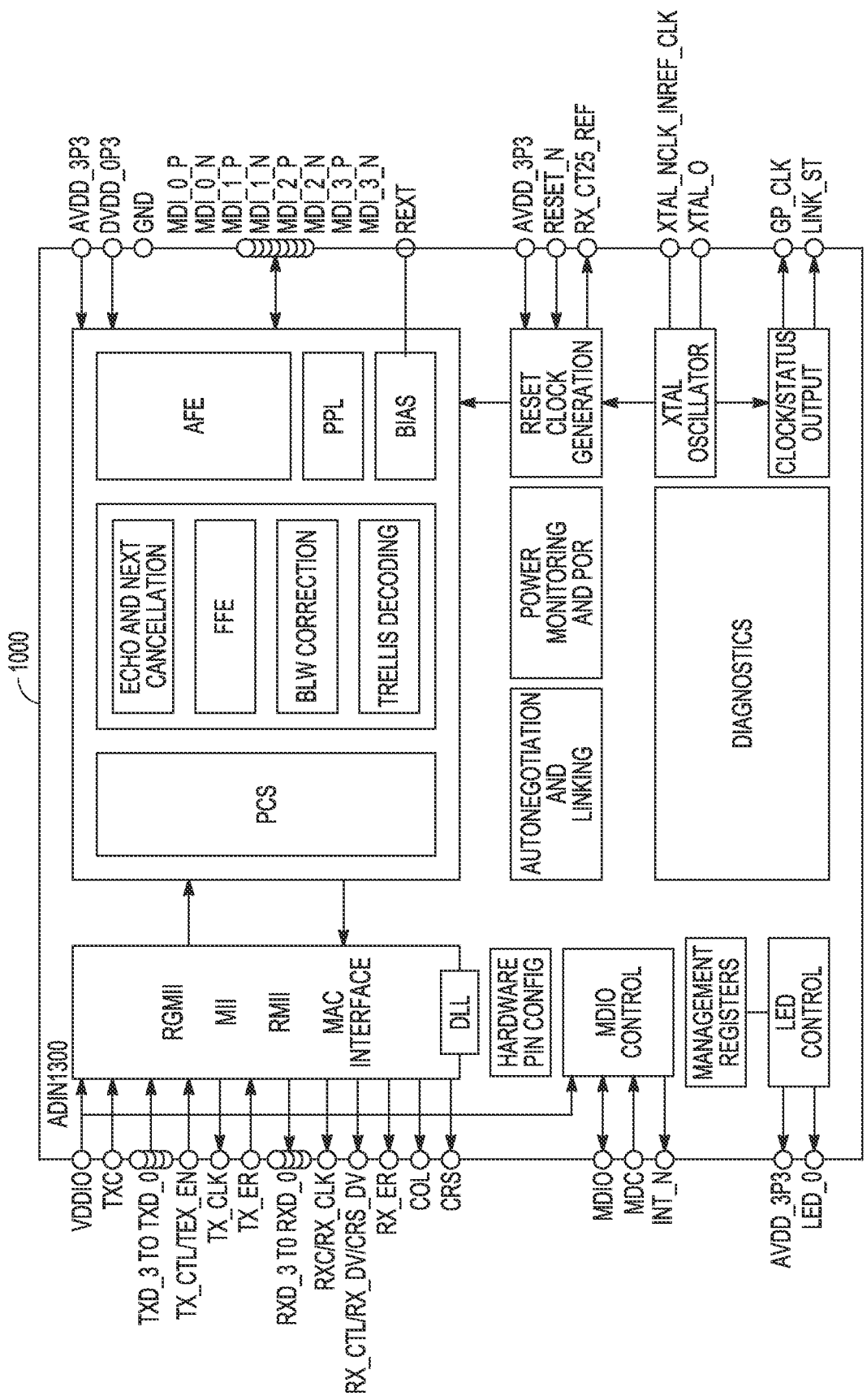
FIG. 10 is a functional block diagram of one example of a multi-pair Ethernet interface.

FIG. 9 shows an RMII interface and a 50 MHz crystal (or clock sourced from the MAC) is used to supply a crystal input (e.g. XTAL_I), clock input (e.g. CLK_IN) or reference clock (e.g. REF_CLK signal). FIG. 10 is a functional block diagram of one example of a multi-pair Ethernet interface. In some embodiments, the multi-pair Ethernet interface (PHY) 512 discussed above with respect to FIG. 5 includes one or more of the functions and/or components illustrated as being included in the multi-pair Ethernet interface 1000 of FIG. 10.

Figure 11:
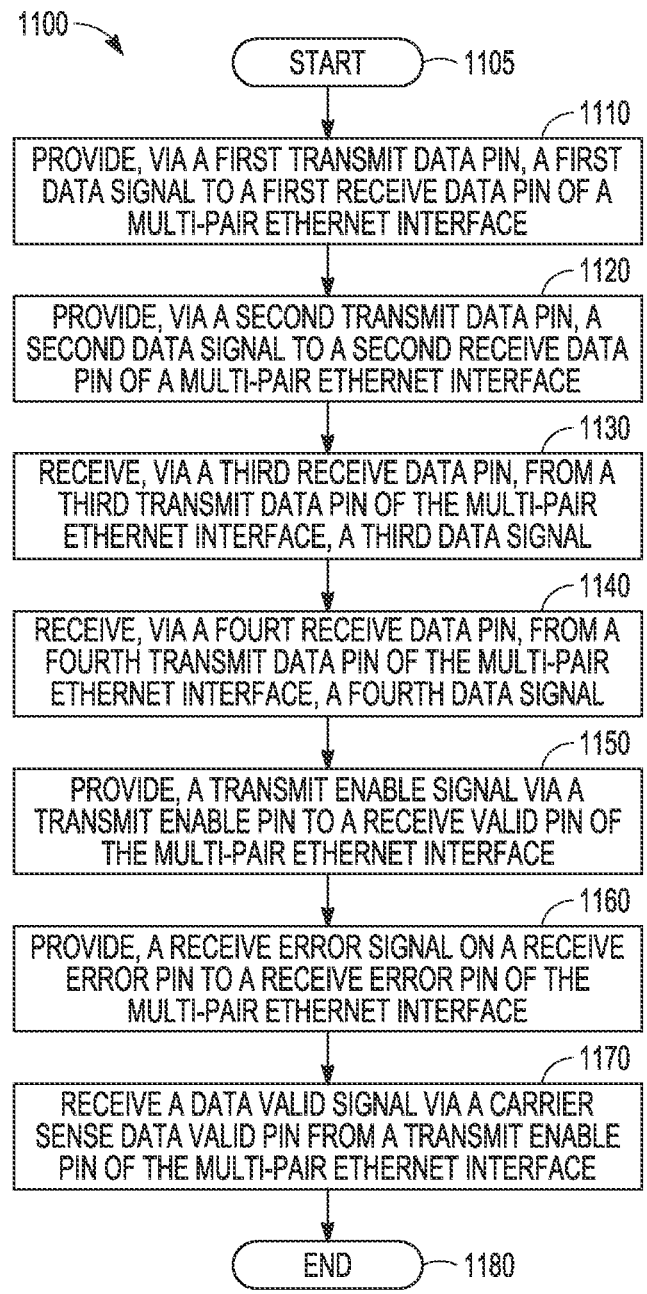
FIG. 11 is a flowchart of an example process for adapting a single-pair Ethernet to a multi-pair Ethernet.

FIG. 11 is a flowchart of an example process for adapting a single-pair Ethernet to a multi-pair Ethernet. In some embodiments, one or more of the functions discussed below with respect to FIG. 11 are performed by processing circuitry of a single-pair Ethernet interface, such as the dual mode single-pair Ethernet interface 510, discussed above with respect to FIG. 5, or the interface 800 discussed above with respect to FIG. 8.

After start operation 1105, process 1100 moves to operation 1110. In operation 1110, where a first data signal is provided, via a first transmit data pin, to a first receive data pin of a multi-pair ethernet interface. In some embodiments, the first transmit data pin is a TXD_0 pin of a first RMII interface (e.g. implemented by a single-pair Ethernet interface, e.g. 510 of FIG. 5 or 802 of FIG. 8), and the first receive data pin is a RXD_0 pin of a second RMII interface implemented by the multi-pair ethernet interface.

In operation 1120, a second data signal is provided, via a second transmit data pin, to a second receive data pin of a multi-pair Ethernet interface. In some embodiments, the second transmit data pin is a TXD_1 pin of the first RMII interface (e.g. implemented by a single-pair Ethernet interface, e.g. 510 of FIG. 5 or 802 of FIG. 8), and the second receive data pin is a RXD_0 pin of the second RMII interface implemented by the multi-pair ethernet interface.

In operation 1130, a third data signal is received, via a third receive data pin (e.g. of a single-pair Ethernet interface) from a third transmit data pin of the multi-pair Ethernet interface. In some embodiments, the third receive data pin is a RXD_0 pin of the first RMII interface (e.g. implemented by a single-pair Ethernet interface, e.g. 510 of FIG. 5 or 802 of FIG. 8), and the third transmit data pin is a TXD_0 pin of the second RMII interface implemented by the multi-pair ethernet interface.

In operation 1140, a fourth data signal is received via a fourth receive data pin (e.g. implemented by a single-pair Ethernet interface, e.g. 510 of FIG. 5 or 802 of FIG. 8). The fourth data signal is received from a fourth transmit data pin of the multi-pair Ethernet interface. In some embodiments, the fourth receive data pin is a RXD_1 pin of the first RMII interface (e.g. implemented by a single-pair Ethernet interface, e.g. 510 of FIG. 5 or 802 of FIG. 8), and the fourth transmit data pin is a TXD_1 pin of the second RMII interface implemented by the multi-pair ethernet interface.

In operation 1150, a transmit enable signal is provided, via a first transmit enable pin (e.g. of a single-pair Ethernet interface such as 510 or 802) to a receive valid pin of the multi-pair Ethernet interface. In some embodiments, the first transmit enable pin is a TX_EN pin of the first RMII interface (e.g. implemented by a single-pair Ethernet interface, e.g. 510 of FIG. 5 or 802 of FIG. 8), and the receive valid pin is a RV_DV pin of the second RMII interface implemented by the multi-pair ethernet interface.

In operation 1160, a receive error signal is provided on a first receive error pin (e.g. of the single-pair Ethernet interface) to a second receive error pin of the multi-pair Ethernet interface. In some embodiments, the receive error signal is a RX_ER pin of the first RMII interface and the second receive error pin is a RX_ERR pin of the second RMII interface.

In operation 1170, a data valid signal is received via a carrier sense data valid pin from a second transmit enable pin of the multi-pair ethernet interface. In some embodiments, the data valid signal is received via a CRS_DV pin of the first RMII interface and the second transmit enable pin is a TX_EN pin the second RMII interface.

In some embodiments, process 1100 includes disabling carrier sense encoding. For example, some embodiments change behavior of a carrier sense pin (e.g. CRS_DV) such that the pin only encodes a receive data value MII signal. This feature allows the carrier sense data valid pin to be connected directly to a transmit enable pin of a multi-pair Ethernet interface. In some embodiments, process 1100 includes detection of start of a frame In some embodiments, detection of a start of a frame via a transmit enable pin and transmit data pins of the multi-pair Ethernet interface is performed as it would in a media access control (MAC) implementation.

In some embodiments, process 1100 includes providing a 25 MHz clock signal to a multi-pair Ethernet interface. In some embodiments, process 1100 includes receiving a 25 MHz clock signal from the multi-pair Ethernet interface. Some embodiments of process 1100 include implementing an RMII interface using the 25 MHz clock signal.

After operation 1170 is complete, process 1100 moves to end operation 1180.

FIG. 12 is a flowchart of an example process for decoding a receive data valid signal. In some embodiments, one or more of the functions discussed below with respect to FIG. 12 are performed by processing circuitry of a single-pair Ethernet interface, such as the dual mode single-pair Ethernet interface 510, discussed above with respect to FIG. 5, or the interface 800 discussed above with respect to FIG. 8. For example, in some embodiments, hardware processing circuitry included in the decode receive data valid component 806 of FIG. 8 performs one or more of the functions discussed below with respect to FIG. 12.

After start operation 1205, process 1200 moves to operation 1210. In operation 1210, an asynchronous carrier sense and data valid (e.g. CRS_DV) signal is received. A carrier sense and data valid signal provides two separate indications, a carrier sense indication and a data valid indication. In some embodiments, the carrier sense and data valid signal is received on a transmit enable pin (e.g. TX_EN) of the single-pair Ethernet interface.

In operation 1220, the signal is synchronized with a reference clock. Decision operation 1230 determines if the synchronized signal is asserted. If the synchronized signal is not asserted, process 1200 returns to operation 1210. If the synchronized signal is asserted, process 1200 moves from decision operation 1230 to decision operation 1240, which determines if a receive data bit zero signal is asserted. In some embodiments, the receive data bit zero signal is received on a transmit data bit zero pin of the single-pair Ethernet interface. If the receive data bit zero signal is not asserted, processing returns to operation 1210. Otherwise, if the receive data bit zero signal (of the multi-pair Ethernet interface) is asserted, process 1200 moves from decision operation 1240 to decision operation 1250, which determines if a receive data bit one signal is asserted. In some embodiments, to determine whether the receive data bit one signal is asserted, a transmit data bit one pin of the single-pair Ethernet interface is evaluated. If the receive data bit one signal (of the multi-pair Ethernet interface) is asserted, process 1200 moves from decision operation 1250 to operation 1210. If the receive data bit one signal is not asserted, process 1200 moves from decision operation 1250 to operation 1260, which asserts a media independent interface (MII) transmit enable signal (e.g. TX_EN) by the single-pair Ethernet interface. The MII transit enable signal is asserted internally to the single-pair Ethernet interface in at least some embodiments to control operation of the single-pair Ethernet interface. After operation 1260 completes, process 1200 moves to end operation 1270.

FIG. 13 is a flowchart of an example process for decoding a receive data valid signal. In some embodiments, one or more of the functions discussed below with respect to FIG. 12 are performed by processing circuitry of a single-pair Ethernet interface, such as the dual mode single-pair Ethernet interface 510, discussed above with respect to FIG. 5, or the interface 800 discussed above with respect to FIG. 8. For example, in some embodiments, hardware processing circuitry included in the decode receive data valid component 806 of FIG. 8 performs one or more of the functions discussed below with respect to FIG. 13. In some aspects, process 1200 and process 1300 are performed together to properly assert an MII TX_EN signal. In some embodiments, process 1300 is performed after process 1200.

After start operation 1305, process 1300 moves to operation 1310. In operation 1310, an asynchronous carrier sense and data valid signal is received (e.g. CRS_DV). In some embodiments, the carrier sense and data valid signal is received on a transmit enable pin of the single-pair Ethernet interface. Decision operation 1315 determines if the asynchronous signal is asserted. If the asynchronous signal is asserted, process 1300 moves from decision operation 1315 to operation 1330, which skips one clock cycle. This provides for process 1300 evaluating the carrier sense and data valid signal every two clock periods. Process 1300 then returns to operation 1310. If the signal is not asserted, process 1300 moves from decision operation 1315 to decision operation 1320, which clears or de-asserts a media independent interface (MII) transmit enable signal (e.g. TX_EN). The MII transmit enable signal controls internal operation of the single-pair Ethernet interface in at least some embodiments. After decision operation 1320 completes, process 1300 moves to end operation 1350.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Example 1 is a single-pair Ethernet to multi-pair Ethernet adapter device, comprising: a multi-pair Ethernet interface; a single-pair Ethernet interface, the device is configured to operate in a conversion mode, the conversion mode establishing an electrically conductive connection between: a first receive data external pin of the multi-pair Ethernet Interface to a first transmit data external pin of the single-pair Ethernet interface, and a second receive data external pin of the multi-pair Ethernet interface to a second transmit data external pin of the single-pair Ethernet interface; a third receive data external pin of the single-pair Ethernet interface to a third transmit data external pin of the multi-pair Ethernet interface; and a fourth receive data external pin of the single-pair Ethernet interface to a fourth transmit data external pin of the multi-pair Ethernet interface, and the single-pair Ethernet interface is configured to decode a carrier sense data valid signal received on a first transmit enable external pin to determine a MII transmit enable value, and to inhibit encoding of a carrier sense signal on a carrier sense data valid external pin.

In Example 2, the subject matter of Example 1 optionally includes wherein the conversion mode further establishes a conductive connection between: a carrier sense receive valid external pin of the multi-pair Ethernet interface to a first transmit enable external pin of the single-pair Ethernet interface; and the carrier sense data valid external pin of the single-pair Ethernet interface to a second transmit enable external pin of the multi-pair Ethernet interface.

In Example 3, the subject matter of any one or more of Examples 1-2 optionally include wherein the single-pair Ethernet interface includes a register, and the single-pair Ethernet interface is configured to operate in the conversion mode based on data written to the register.

In Example 4, the subject matter of any one or more of Examples 1-3 optionally include wherein the single-pair Ethernet interface is configured to read data from a configuration pin, and to operate in the conversion mode based on the configuration pin.

In Example 5, the subject matter of any one or more of Examples 1-4 optionally include MHz reference clock.

In Example 6, the subject matter of any one or more of Examples 1-5 optionally include wherein the single-pair Ethernet interface comprises one of a RGMII or RMII interface.

In Example 7, the subject matter of any one or more of Examples 1-6 optionally include wherein the multi-pair Ethernet interface comprises a RMII interface.

In Example 8, the subject matter of any one or more of Examples 1-7 optionally include a semi-conductor module, the semi-conductor module comprising the single-pair Ethernet interface and the multi-pair Ethernet interface, the single-pair Ethernet interface and the multi-pair Ethernet interface connected to each other inside a single package.

In Example 9, the subject matter of any one or more of Examples 1-8 optionally include a memory buffer, and hardware processing circuitry configured to perform operations comprising performing rate conversion, based on the memory buffer, between the single-pair Ethernet interface and the multi-pair Ethernet interface.

In Example 10, the subject matter of any one or more of Examples 1-9 optionally include a serial peripheral interface (SPI), wherein the single-pair Ethernet interface is configured to communicate with the SPI, and the multi-pair Ethernet interface is configured to communicate with the SPI.

Example 11 is a method for adapting single-pair Ethernet to multi-pair Ethernet, comprising: providing, via a receive data bit zero pin of a single-pair Ethernet interface, a first data signal to a transmit data bit zero pin of a multi-pair Ethernet interface; providing, via a receive data bit one pin of a single-pair Ethernet interface, a second data signal to a transmit data bit one pin of a multi-pair Ethernet interface; receiving, via a transmit data bit zero pin of the single-pair Ethernet interface, a third data signal from a receive data bit zero pin of the multi-pair Ethernet interface; receiving, via a transmit data bit one pin of the single-pair Ethernet interface, a fourth data signal from a receive data bit one pin of the multi-pair Ethernet interface; receiving, via a transmit enable pin of the single-pair Ethernet interface, a carrier sense data valid signal from a carrier sense data valid pin of the multi-pair Ethernet interface; decoding the carrier sense data valid signal to determine a MII transmit enable value; and providing, via a carrier sense data valid pin of the single-pair Ethernet interface, a transmit data valid signal by inhibiting encoding of a carrier sense signal on the carrier sense data valid pin.

In Example 12, the subject matter of Example 11 optionally includes in response to the register value meeting a criterion.

In Example 13, the subject matter of any one or more of Examples 11-12 optionally include in response to the data value meeting a criterion.

In Example 14, the subject matter of any one or more of Examples 11-13 optionally include generating a 25 MHz clock output signal; providing the 25 MHz clock signal to a clock input pin of the multi-pair Ethernet interface; and implementing a reduced media independent interface (RMII) based on a 25 MHz reference clock signal.

In Example 15, the subject matter of any one or more of Examples 11-14 optionally include performing rate conversion before providing the first and second data signals to the multi-pair Ethernet interface.

In Example 16, the subject matter of any one or more of Examples 11-15 optionally include coding a receive data valid signal on a carrier sense data valid pin.

In Example 17, the subject matter of any one or more of Examples 11-16 optionally include detecting a start of a frame on a transmit enable pin, and one or more transmit data pins consistent with media access control.

Example 18 is a non-transitory computer readable storage medium comprising instructions that configure hardware processing circuitry to perform operations to adapt a single-pair Ethernet to a multi-pair Ethernet, the operations comprising: providing, via a receive data bit zero pin of a single-pair Ethernet interface, a first data signal to a transmit data bit zero pin of a multi-pair Ethernet interface; providing, via a receive data bit one pin of a single-pair Ethernet interface, a second data signal to a transmit data bit one pin of a multi-pair Ethernet interface; receiving, via a transmit data bit zero pin of the single-pair Ethernet interface, a third data signal from a receive data bit zero pin of the multi-pair Ethernet interface; receiving, via a transmit data bit one pin of the single-pair Ethernet interface, a fourth data signal from a receive data bit one pin of the multi-pair Ethernet interface; receiving, via a transmit enable pin of the single-pair Ethernet interface, a carrier sense data valid signal from a carrier sense data valid pin of the multi-pair Ethernet interface; decoding the carrier sense data valid signal to determine a MU transmit enable value; and providing, via a carrier sense data valid pin of the single-pair Ethernet interface, a transmit data valid signal by inhibiting encoding of a carrier sense signal on the carrier sense data valid pin.

In Example 19, the subject matter of Example 18 optionally includes in response to the register value meeting a criterion.

In Example 20, the subject matter of any one or more of Examples 18-19 optionally include the operations further comprising: generating a 25 MHz clock output signal; providing the 25 MHz clock signal to a clock input pin of the multi-pair Ethernet interface; and implementing a reduced media independent interface (RMII) based on a 25 MHz reference clock signal.

The techniques of various embodiments may be implemented using software, hardware and/or a combination of software and hardware. Various embodiments are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various embodiments are also directed to methods, e.g., method of controlling and/or operating a communications device or devices, e.g., a network management node, an access point, wireless terminals (WT), user equipment (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are provided as example approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the operations of the disclosed embodiments.

In some embodiments, the processor or processors, e.g., CPUs, of one or more devices, e.g., communications devices such as routers, switches, network attached servers, network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of a communications system including wired, optical, cellular, Wi-Fi, Bluetooth and BLE, at least some of the methods and apparatus of various embodiments are applicable to a wide range of communications systems including IP and non-IP based, OFDM and non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with IP based and non-IP, wired and wireless such CDMA, orthogonal frequency division multiplexing (OFDM), Wi-Fi, Bluetooth, BLE, optical and/or various other types of communications techniques which may be used to provide communications links between network attached or associated devices or other devices including receiver/transmitter circuits and logic and/or routines, for implementing the methods.

The invention claimed is:

1. A single-pair Ethernet to multi-pair Ethernet adapter device, comprising:
   a multi-pair Ethernet interface;
   a single-pair Ethernet interface, the device is configured to operate in a conversion mode, the conversion mode establishing an electrically conductive connection between:
   a first receive data external pin of the multi-pair Ethernet Interface to a first transmit data external pin of the single-pair Ethernet interface;
   a second receive data external pin of the multi-pair Ethernet interface to a second transmit data external pin of the single-pair Ethernet interface;
   a third receive data external pin of the single-pair Ethernet interface to a third transmit data external pin of the multi-pair Ethernet interface;
   a fourth receive data external pin of the single-pair Ethernet interface to a fourth transmit data external pin of the multi-pair Ethernet interface, and the single-pair Ethernet interface is configured to decode a carrier sense data valid signal received on a first transmit enable external pin to determine a media independent interface (MII) transmit enable value, and to inhibit encoding of a carrier sense signal on a carrier sense data valid external pin;
   a carrier sense receive valid external pin of the multi-pair Ethernet interface to a first transmit enable external pin of the single-pair Ethernet interface; and
   the carrier sense data valid external pin of the single-pair Ethernet interface to a second transmit enable external pin of the multi-pair Ethernet interface.

2. The adapter device of claim 1, wherein the single-pair Ethernet interface includes a register, and the single-pair Ethernet interface is configured to operate in the conversion mode based on data written to the register.

3. The adapter device of claim 1, wherein the single-pair Ethernet interface is configured to read data from a configuration pin, and to operate in the conversion mode based on the configuration pin.

4. The adapter device of claim 1, wherein the single-pair Ethernet interface includes a 25 MHz clock, and generates a 25 MHz clock output signal based on the 25 MHz clock, and the 25 MHz clock output signal is provided to a clock input external pin of the multi-pair Ethernet interface, and the single-pair Ethernet interface is configured to implement a RMII interface at 10 Mb/sec based on a 25 MHz reference clock.

5. The adapter device of claim 1, wherein the single-pair Ethernet interface comprises one of a RGMII or RMII interface.

6. The adapter device of claim 1, wherein the multi-pair Ethernet interface comprises a RMII interface.

7. The adapter device of claim 1, further comprising a semi-conductor module, the semi-conductor module comprising the single-pair Ethernet interface and the multi-pair Ethernet interface, the single-pair Ethernet interface and the multi-pair Ethernet interface connected to each other inside a single package.

8. The adapter device of claim 1, further comprising:
a memory buffer, and
hardware processing circuitry configured to perform operations comprising performing rate conversion, based on the memory buffer, between the single-pair Ethernet interface and the multi-pair Ethernet interface.

9. The adapter device of claim 1, further comprising a serial peripheral interface (SPI), wherein the single-pair Ethernet interface is configured to communicate with the SPI, and the multi-pair Ethernet interface is configured to communicate with the SPI.

10. A method for adapting single-pair Ethernet to multi-pair Ethernet, comprising:
providing, via a receive data bit zero pin of a single-pair Ethernet interface, a first data signal to a transmit data bit zero pin of a multi-pair Ethernet interface;
providing, via a receive data bit one pin of the single-pair Ethernet interface, a second data signal to a transmit data bit one pin of the multi-pair Ethernet interface;
receiving, via a transmit data bit zero pin of the single-pair Ethernet interface, a third data signal from a receive data bit zero pin of the multi-pair Ethernet interface;
receiving, via a transmit data bit one pin of the single-pair Ethernet interface, a fourth data signal from a receive data bit one pin of the multi-pair Ethernet interface;
receiving, via a transmit enable pin of the single-pair Ethernet interface, a carrier sense data valid signal from a carrier sense data valid pin of the multi-pair Ethernet interface;
decoding the carrier sense data valid signal to determine a media independent interface (MII) transmit enable value; and
providing, via a carrier sense data valid pin of the single-pair Ethernet interface, a transmit data valid signal by inhibiting encoding of a carrier sense signal on the carrier sense data valid pin.

11. The method of claim 10, further comprising reading a register value of the single-pair Ethernet interface and performing the method of claim 10 in response to the register value meeting a criterion.

12. The method of claim 10, further comprising reading a data value from a configuration pin, and performing the method of claim 10 in response to the data value meeting a criterion.

13. The method of claim 10, further comprising:
generating a 25 MHz clock output signal;
providing the 25 MHz clock signal to a clock input pin of the multi-pair Ethernet interface; and
implementing a reduced media independent interface (RMII) based on a 25 MHz reference clock signal.

14. The method of claim 10, further comprising performing rate conversion before providing the first and second data signals to the multi-pair Ethernet interface.

15. The method of claim 10, further comprising coding a receive data valid signal on a carrier sense data valid pin.

16. The method of claim 10, further comprising detecting a start of a frame on the transmit enable pin, and one or more transmit data pins consistent with media access control.

17. A non-transitory computer readable storage medium comprising instructions that configure hardware processing circuitry to perform operations to adapt a single-pair Ethernet to a multi-pair Ethernet, the operations comprising:
providing, via a receive data bit zero pin of a single-pair Ethernet interface, a first data signal to a transmit data bit zero pin of a multi-pair Ethernet interface;
providing, via a receive data bit one pin of the single-pair Ethernet interface, a second data signal to a transmit data bit one pin of the multi-pair Ethernet interface;
receiving, via a transmit data bit zero pin of the single-pair Ethernet interface, a third data signal from a receive data bit zero pin of the multi-pair Ethernet interface;
receiving, via a transmit data bit one pin of the single-pair Ethernet interface, a fourth data signal from a receive data bit one pin of the multi-pair Ethernet interface;
receiving, via a transmit enable pin of the single-pair Ethernet interface, a carrier sense data valid signal from a carrier sense data valid pin of the multi-pair Ethernet interface;
decoding the carrier sense data valid signal to determine a media independent interface (MII) transmit enable value; and
providing, via a carrier sense data valid pin of the single-pair Ethernet interface, a transmit data valid signal by inhibiting encoding of a carrier sense signal on the carrier sense data valid pin.

18. The non-transitory computer readable storage medium of claim 17, the operations further comprising reading a register value of the single-pair Ethernet interface and performing the operations of claim 17 in response to the register value meeting a criterion.

19. The non-transitory computer readable storage medium of claim 17, the operations further comprising:
generating a 25 MHz clock output signal;
providing the 25 MHz clock signal to a clock input pin of the multi-pair Ethernet interface; and
implementing a reduced media independent interface (RMII) based on a 25 MHz reference clock signal.

* * * * *